Sept. 10, 1929.  G. E. WINTZ  1,728,093
AUTOMOBILE TOP PAD
Filed Feb. 8, 1928   2 Sheets-Sheet 1
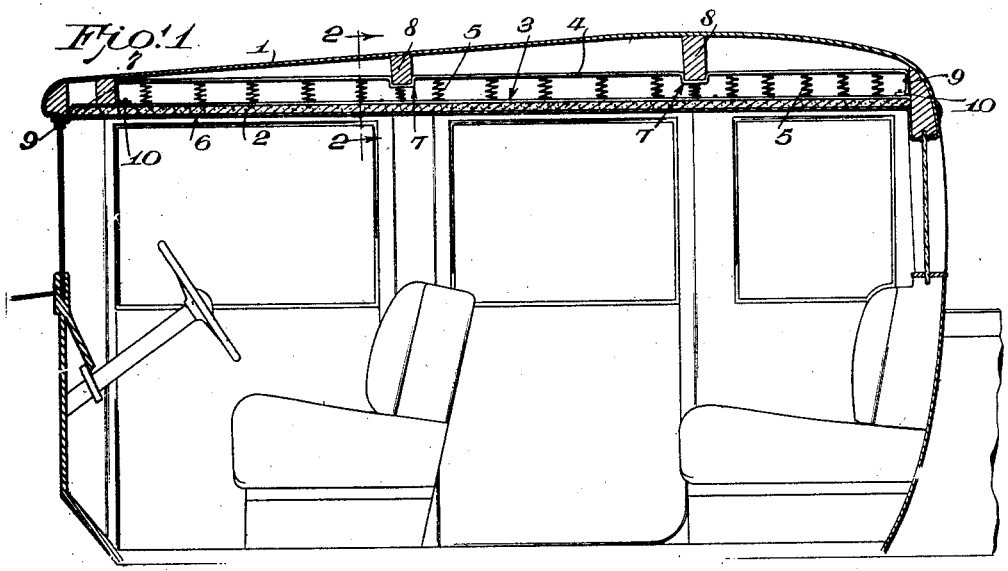
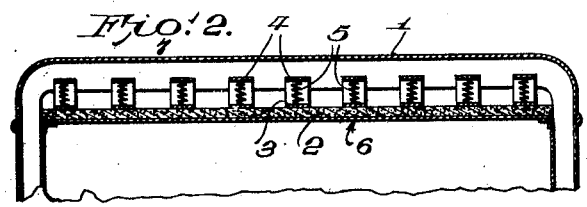
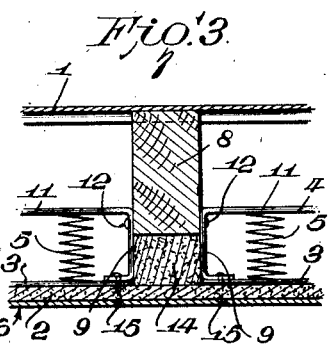
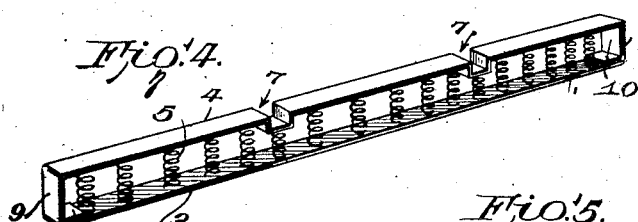
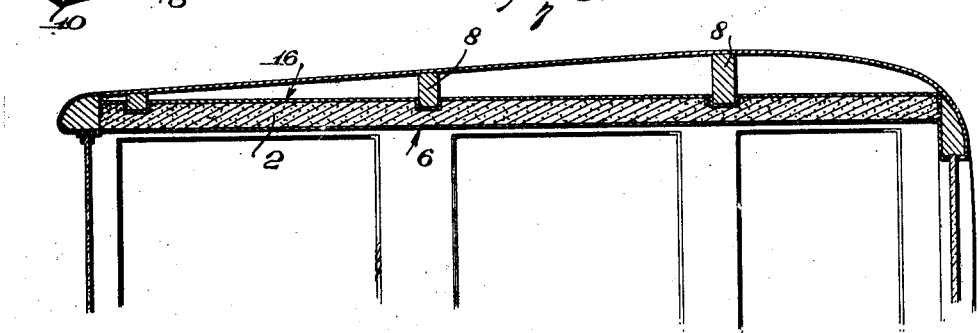
INVENTOR
George E. Wintz
BY
ATTORNEY

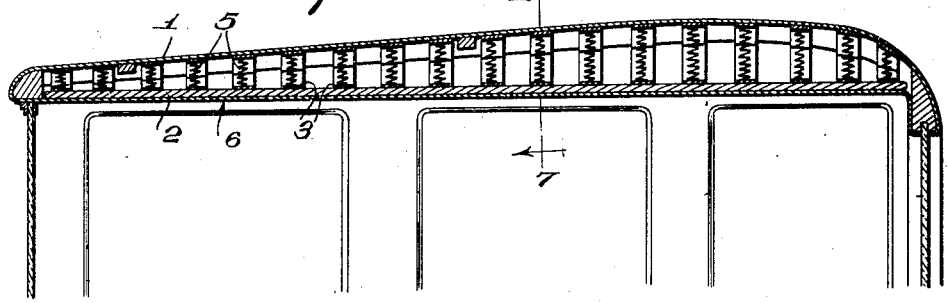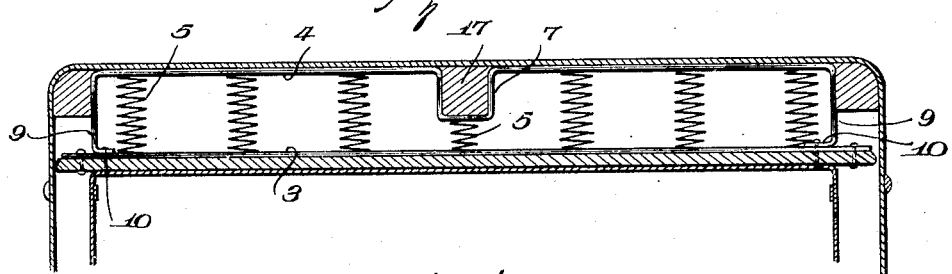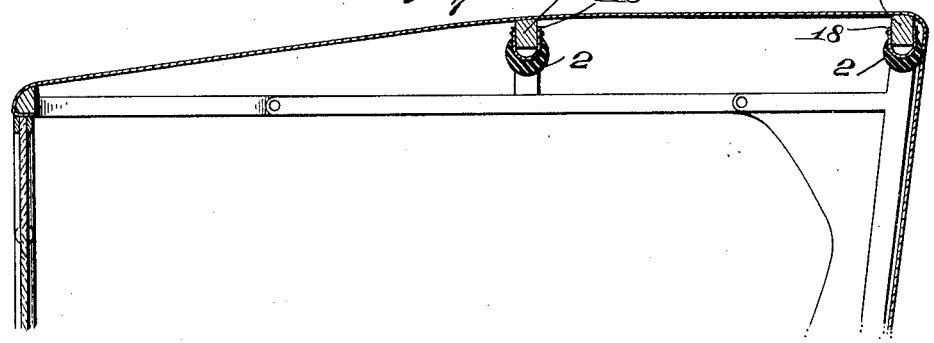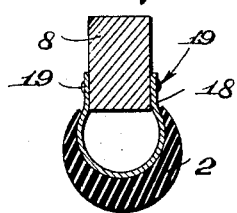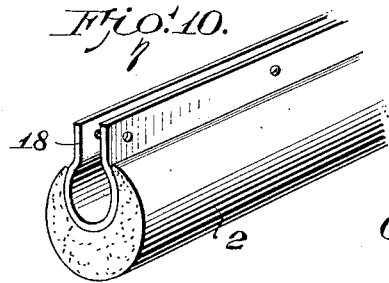

Patented Sept. 10, 1929.

1,728,093

UNITED STATES PATENT OFFICE.

GEORGE E. WINTZ, OF NEW YORK, N. Y.

AUTOMOBILE TOP PAD.

Application filed February 8, 1928. Serial No. 252,833.

This invention relates to improvements in automobile tops, and it consists in the constructions, combinations and arrangements herein described and claimed.

An object of the invention is to provide a pad either suitably incorporated in the top of an automobile as originally constructed, or capable of incorporation in tops already built, for the purpose of preventing injury to the heads of occupants of the automobile when the latter is subjected to sudden jolts.

Other objects and advantages appear in the following specification reference being had to the accompanying drawings in which, Figure 1 is a longitudinal section of the interior of an automobile to illustrate the application of the pad to the top, Figure 2 is a cross section taken on the line 2—2 of Figure 1, Figure 3 is a detail cross section illustrating a slight modification later referred to, Figure 4 is a perspective view of one of the longitudinal spring frames, Figure 5 is a longitudinal section of an automobile top illustrating a modified form of pad, Figure 6 is a longitudinal section illustrating an adaptation of the pad to an automobile top having longitudinal bows, Figure 7 is a cross section taken on the line 7—7 of Figure 6, Figure 8 is a longitudinal section illustrating a modified form of pad adaptable to the bows of open-car tops, Figure 9 is a detail sectional view of a part of the construction in Figure 8, Figure 10 is a detail perspective view of the pad and clip illustrated in Figures 8 and 9.

It is not an uncommon experience for the passengers of a motor vehicle to become the surprised recipients of more or less severe blows about their heads in case the driver fails to avoid a bad place in the road and thus subjects the vehicle to a severe jolt. Injuries received under such circumstances are obviously not confined to the heads of the passengers but may easily cause permanent damage to the head gear of such passengers.

In any case the damage is bad enough, and inasmuch as bad places in the road as well as adventurously inclined drivers are not as yet things of the past the inclination for effecting a remedy may quite naturally extend to so improving the automobile top that the inevitable jolt will not be accompanied by personal injuries. To the latter end it is proposed to furnish the automobile top 1 with a padding 2.

Although the application discloses a number of modifications the foregoing numerals apply to each instance where the top and padding are concerned. The padding 2, which in Figures 1 and 7 may be regarded as of sponge rubber, cotton batting or other similar and suitable material, is appropriately attached to the webs 3 (Fig. 4) of spring frames that include base bars 4 and coil springs 5. A fabric cover 6 conceals the pad and its appendages.

It may here be explained that the pad structure may be incorporated in the automobile top during the original building thereof or the pad structure may be incorporated in tops already in use. In the latter instance the customary fabric cover or interior lining of closed cars is simply removed long enough to permit the installation of the pad whereupon such cover is replaced. There is no difference in the appearance of the ultimate result.

Depressions 7 in the base bars 4 receive the cross bows 8 of the top in Figure 1. Here the base bars extend longitudinally of the top. The front and rear extremities of the base bars are bent downwardly and inwardly at 9 and 10 to provide supports to which the extremities of the webs 3 are attached. These webs may be composed either of fabric or metal, but in any instance must be sufficiently yieldable not to defeat the cushioning effect of the carried pad. The ends of the springs 5 are attached to the web 3 and base bar 4.

Figure 3 illustrates a modification to the extent that the relatively long base bars 4 of Figure 1 are made in sections 11 that are individually attached as at 12 at the adjoining ends to a cross bow 8. The void that would otherwise occur between the down turned portions 9, the under surface of the cross bow 8 and the under surface of the pad 2 is preferably filled with an insert 14 of sponge rubber or other appropriate filling material.

Adjacent ends of the webs 3 that are also now made in sections are attached to the inturned portions of the bars 4 as shown. The securing means 15 at these points pass through the pad 2 and may also be made to pass through the interior cover 6 in cases of original construction. It is to be observed in Figures 1 and 4 that the resilient elements immediately under the cross bows comprise a series of short coiled springs.

Figure 5 illustrates a modification wherein the pad 2 abuts a lining 16 which in this instance takes the place of the webs 3. This lining may be composed of a sheet of sufficiently strong fabric that completely covers the pad on the top side. It is conceivable that the lining may be composed of crossed webs. It is equally possible to make the lining of thin and yielding sheet metal.

In any case allowance must be made for the cross bows 8. In the instance of a fabric lining both the latter and the pad will readily conform to the cross bows when applied thereto, the depression for the cross bows forming of its own accord. In the case of a metallic lining the depressions must be formed. The interior cover 6 conceals the pad.

Figures 6 and 7 differ from the first form of the invention in Figures 1, 2 and 4 mainly by the fact that the base bars 4 extend crosswise of the top 1 rather than lengthwise. The depressions 7, as well as down and inwardly turned ends 9 and 10, are to be noted. The web 3 (Fig. 7) extends slightly beyond the down turned ends 9, which it may easily be made to do in case it is composed of metal, giving the added advantage of a full padding surface on the inside of the vehicle. The purpose of the crosswise arrangement of the spring frames in Figures 6 and 7 is to offer a variation as well as to provide for automobile tops having longitudinal bows 17.

The foregoing applications of the inventions relate to closed automobiles. Figures 8, 9 and 10 make provision for open cars and divisional application #311,091 has been filed on Oct. 8, 1928 for this modification. The pad 2, now of an essentially different construction, is carried by a spring clip 18. This clip is of substantial U-shape. It is intended to be fitted upon a cross bow 8 and there secured by means 19. It seems possible to make the clip 18 of sufficiently strong resilient material to cause the pad to remain in place upon a cross bar without the aid of securing means. However, the use of the latter seems preferable. The operation is readily understood. In all instances the pad 2 is of soft material. Sponge rubber and cotton batting seem to be preferable padding materials, although use is not confined to such materials.

In each instance it is to be noted that the pad opposes a yieldable support. In Figures 1 to 7 inclusive the yieldable support comprises a series of spring frames running either lengthwise or crosswise of the vehicle top as may seem desirable. In Figures 8, 9 and 10 the yieldable support comprises the U-clip 18 which by preference is made of sufficiently resilient material to permit a slight collapse when struck a blow from the underside.

It is readily seen that a person bounding from his seat under the impetus of a sufficiently severe jolt of the vehicle will be protected from injury to his head when striking the softly padded top. The danger points exist along the bows 8 and these points, as plainly seen, are protected with a care equal to that of any other point over the padded area.

While the construction and arrangement of the improved top pad is that of generally preferred forms, obviously further modifications may be made without departing from the spirit of the invention or the scope of the claims.

I claim:—

1. The combination of a vehicle having a top with an interior cover and a bow, a pad concealed above the cover, base bars located within the top and being shaped to conform to the bow the ends of the bars being bent, yielding webs spanning the bars and being secured to the bent ends, and resilient means interposed between the bars and webs some of said resilient means being located in the region of the bow.

2. In combination with a top including a bow and a cover, a pad concealed by the cover, resilient means coacting with the pad, base bar sections including webs by which the resilient means are carried, adjoining ends of the sections being attached to the bow and extending beyond a side thereof, and an insert located between the bow, ends of the sections and padding.

Signed at Washington, D. C., this 3rd day of February 1928.

GEORGE E. WINTZ.